(12) United States Patent
Chen

(10) Patent No.: US 6,167,780 B1
(45) Date of Patent: *Jan. 2, 2001

(54) DEVICE FOR MAKING MICRO ADJUSTING THE STEERING BEARING OF BICYCLE

(76) Inventor: Sheng-Luen Chen, 3rd Floor, 164-19, Sec. 3, Shi Twen Road, Taichung (TW)

( * ) Notice: Under 35 U.S.C. 154(b), the term of this patent shall be extended for 0 days.

This patent is subject to a terminal disclaimer.

(21) Appl. No.: 08/377,883

(22) Filed: Jan. 24, 1995

(51) Int. Cl.⁷ .................................................. B62K 21/12
(52) U.S. Cl. .............................................. 74/551.1; 74/551.8
(58) Field of Search .............................. 74/551.1–551.8; 280/279, 280; 384/540, 545, 517, 537; 403/131, 344, 104

(56) References Cited

U.S. PATENT DOCUMENTS

| | | | |
|---|---|---|---|
| 4,850,733 | * 7/1989 | Shook | 403/104 |
| 5,011,104 | * 4/1991 | Fang | 403/104 X |
| 5,085,063 | * 2/1992 | Van Dyke et al. | 280/279 X |
| 5,095,770 | * 3/1992 | Rader | 74/551.1 |
| 5,193,930 | * 3/1993 | Chi | 403/344 X |
| 5,319,993 | * 6/1994 | Chiang | 384/545 X |
| 5,331,864 | * 7/1994 | Chi | 403/370 X |
| 5,387,255 | * 2/1995 | Chiang | 280/279 X |
| 5,445,047 | * 8/1995 | Chi | 74/551.3 X |
| 5,454,281 | * 10/1995 | Chi | 74/551.1 |

* cited by examiner

Primary Examiner—Vinh T. Luong
(74) Attorney, Agent, or Firm—Raymond Y. Chan; David & Raymond

(57) ABSTRACT

A device for making micro adjusting a steering bearing of a head bowl of a bicycle head tube includes an inner ring of the steering bearing, a pressing ring and a clamping ring, which are mounted sequentially together in an upper end of the bicycle head tube. An upper end of the clamping ring is fastened with a handlebar upright tube of the bicycle, wherein the clamping ring provides a pair of lugs, each lug having a threaded hole for engaging with a fastening means, the clamping ring is provided with an inner circumferential tapered surface. The inner ring of the steering bearing is provided with an inner circumferential tapered surface. The pressing ring is provided with an upper outer circumferential tapered surface and a lower outer circumferential tapered surface. The upper outer circumferential tapered surface of the pressing ring is engaged with the inner circumferential surface of the clamping ring. The lower circumferential tapered surface of the pressing ring is engaged with the inner circumferential tapered surface of the inner ring. When the clamping ring is fastened by the fastening means, the pressing ring is caused to move downwards to bring about a downward displacement of the inner ring, which results in a minute fastening of the steering bearing.

2 Claims, 5 Drawing Sheets

DEVICE FOR MAKING MICRO ADJUSTING THE STEERING BEARING OF BICYCLE

FIELD OF THE INVENTION

The present invention relates generally to a bicycle, and more particularly to a device for adjusting and locating the steering bearing of a bicycle head bowl.

BACKGROUND OF THE PRESENT INVENTION

As disclosed in the U.S. Pat. No. 5,095,770, a prior art mechanism for locating and calibrating the bearing of a bicycle head bowl comprises a fastening bolt which is located at the upper end of the handlebar upright tube of the handlebar and is capable of being caused to force an elastic fitting member to expand outwardly and radically so as to be fastened on the inner circumferential fringe of the front fork tube, thereby causing the washer located on the fastening bolt to push the handlebar upright tube to move downwards to urge and locate the steering bearing.

Such a fastening mechanism of the prior art as described above has inherent shortcomings, which are described hereinafter.

The downward displacement of the handlebar upright tube is brought about in the same direction as the fastening bolt is fastened. As a result, the displacement distance of the handlebar upright tube is corresponding to the fastening distance of the fastening bolt. For this reason, the bearing of the bicycle head bowl is likely to be fastened excessively I a situation calling for a micro adjustment of the bearing.

The prior art fastening mechanism is complicated in construction and is therefore expensive to make.

SUMMARY OF THE PRESENT INVENTION

It is therefore the primary objective of the present invention to provide a device capable of making a minute fastening of the bearing of a bicycle head bowl. The device for making micro adjusting a steering bearing of a head bowl of a bicycle head tube comprises an inner ring of the steering bearing, a pressing ring and a clamping ring, which are mounted sequentially together in an upper end of the bicycle head tube. An upper end of the clamping ring is fastened with a handlebar upright tube of the bicycle, wherein the clamping ring provides a pair of lugs, each lug having a threaded hole for engaging with a fastening means, the clamping ring is provided with an inner circumferential tapered surface. The inner ring of the steering bearing is provided with an inner circumferential tapered surface. The pressing ring is provided with an upper outer circumferential tapered surface and a lower outer circumferential tapered surface. The upper outer circumferential tapered surface of the pressing ring is engaged with the inner circumferential surface of the clamping ring. The lower circumferential tapered surface of the pressing ring is engaged with the inner circumferential tapered surface of the inner ring. When the clamping ring is fastened by the fastening means, the pressing ring is caused to move downwards to bring about a downward displacement of the inner ring, which results in a minute fastening of the steering bearing.

DETAILED DESCRIPTION OF THE PREFERRED EMBODIMENT

Figure 1:
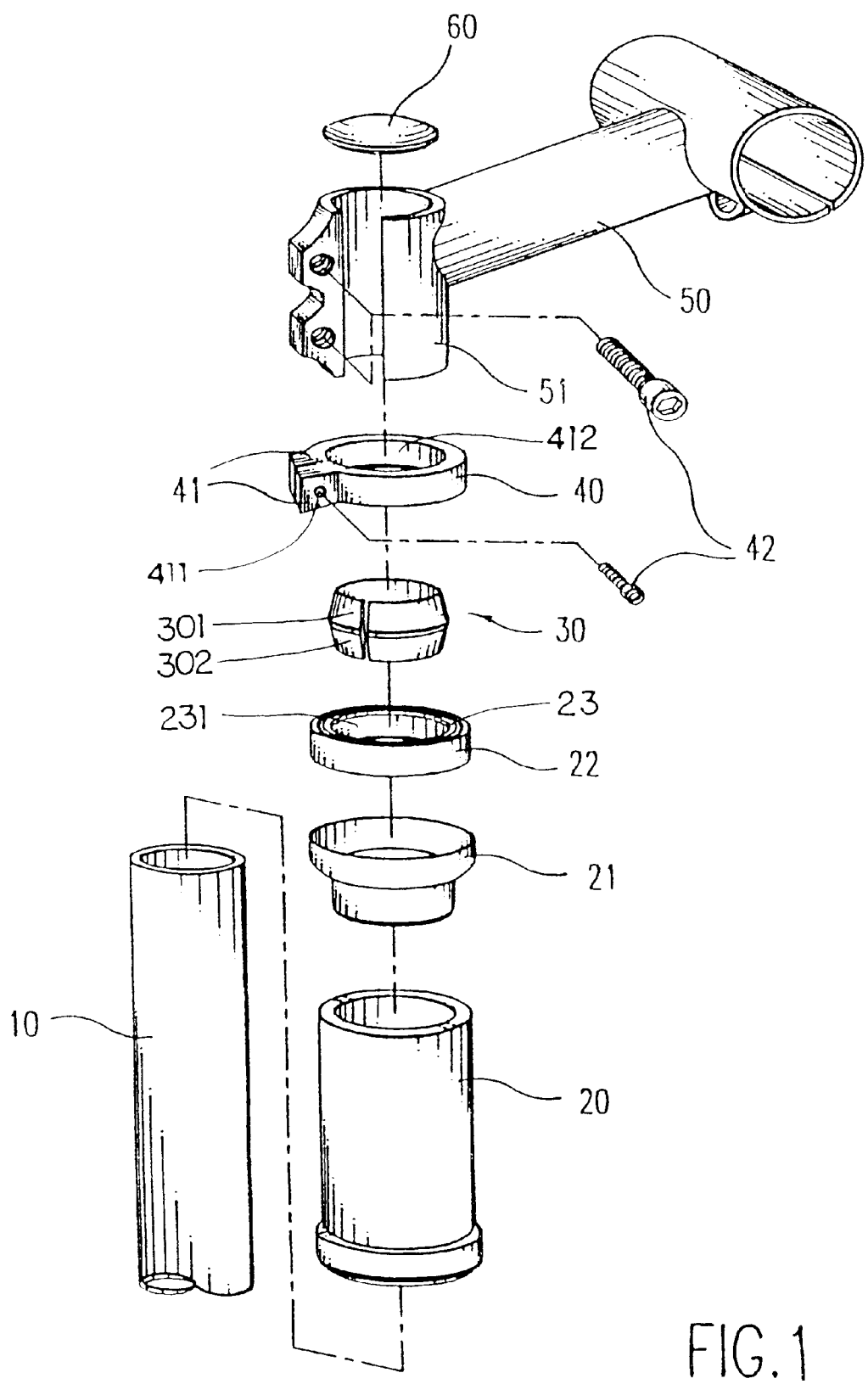
FIG. 1 shows an exploded view of the present invention.
Figure 2:
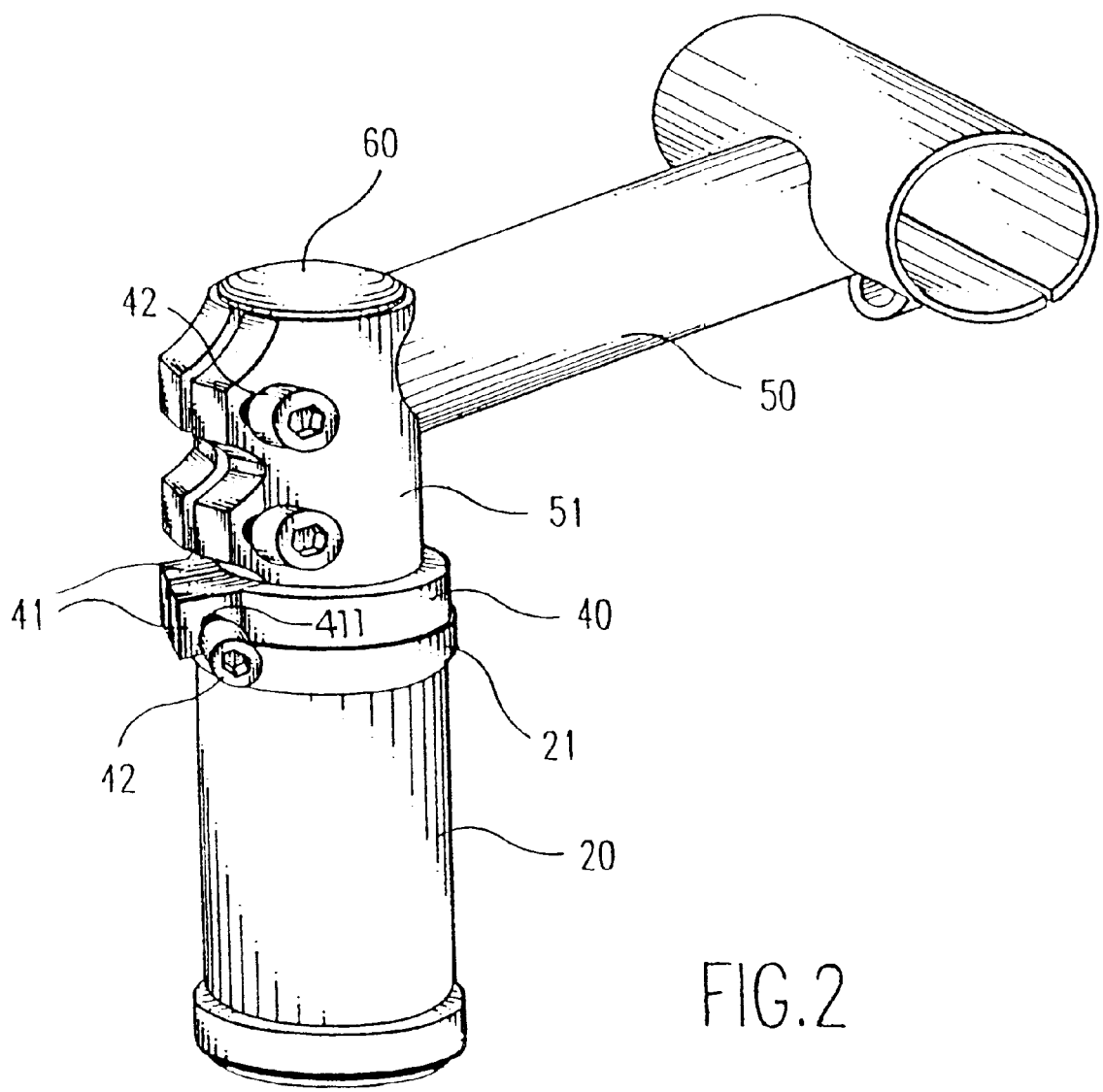
FIG. 2 shows a perspective view of the present invention in combination.
Figure 3:
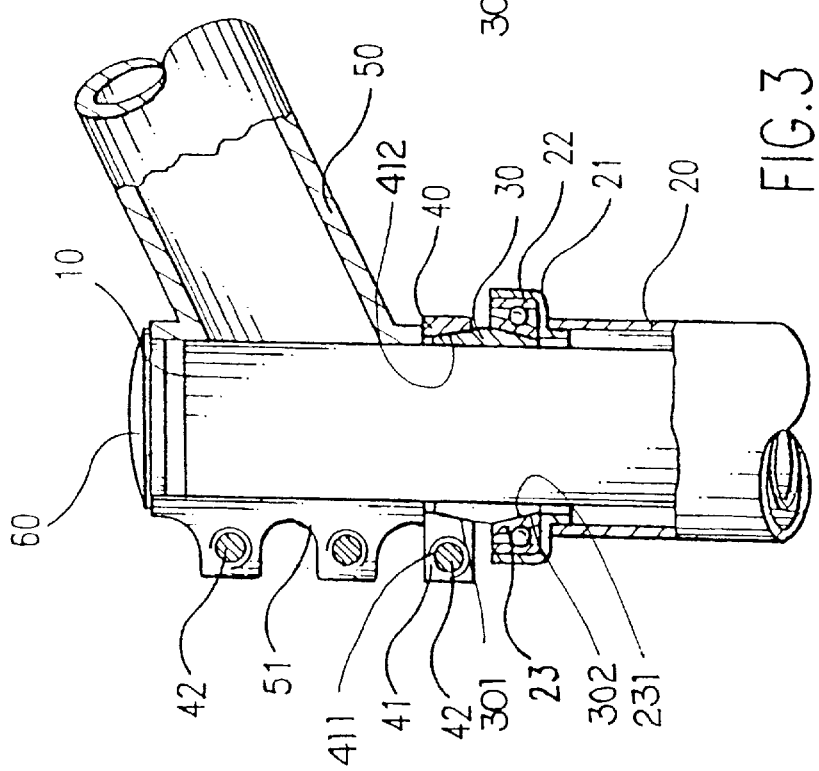
FIG. 3 shows a longitudinal sectional view of the present invention as shown in FIG. 2.

As shown in FIGS. 1 to 3, a bicycle front fork tube 10 is fitted into a head tube 20 having an upper end to which a head bowl 21, a steering bearing 22, a pressing ring 30, and a clamping ring 40 are fastened sequentially. The upper end of the head tube 20 is then fastened with the bottom end of a handlebar upright tube 51 of a handlebar support 50. The clamping ring 40 is provided with a pair of lugs 41. Each lug 41 has a threaded hole 411 for engaging with a fastening bolt 42. The handlebar upright tube 51 is provided at the top thereof with a cap 60.

The present invention is characterized in that the clamping ring 40 has an inner circumferential tapered surface 412, and that the inner ring 23 of the steering bearing 22 has an inner circumferential tapered surface 231, and further that the pressing ring 30 has an upper and a lower outer circumferential tapered surfaces 301, 302, in which the upper outer circumferential tapered surface 301 is inclined inwardly and upwardly from the middle portion to the upper end and the lower outer circumferential tapered surface 302 is inclined inwardly and upwardly from the middle portion to the lower end, so that the outer diameters of the two ends of the pressing ring 30 are smaller than the outer diameter of the middle portion thereof. The upper outer circumferential tapered surface 301 of the pressing ring 30 is engaged with the inner circumferential surface 412 of the clamping ring 40. The lower circumferential tapered surface 302 of the pressing ring is engaged with the inner circumferential tapered surface 231 of the inner ring 23 of the steering bearing 22.

As the fastening bolt 42 is fastened, the pressing ring 30 is actuated to move downwards so as to cause the steering bearing 22 to move downwards by urging upon the inner ring 23 thereof accordingly, thereby bringing about the effect of fastening the steering bearing 22. The downward displacements of the pressing ring 30 and the inner ring 23 take place in a minute manner that an excessive fastening of the steering bearing 22 is effectively averted. In other words, the micro adjustment of the steering bearing 22 of the bicycle head bowl 21 is made possibly by the afore-mentioned unique designs of the clamping ring 40, the pressing ring 30 and the inner ring 23 of the steering bearing 22.

Figure 6:
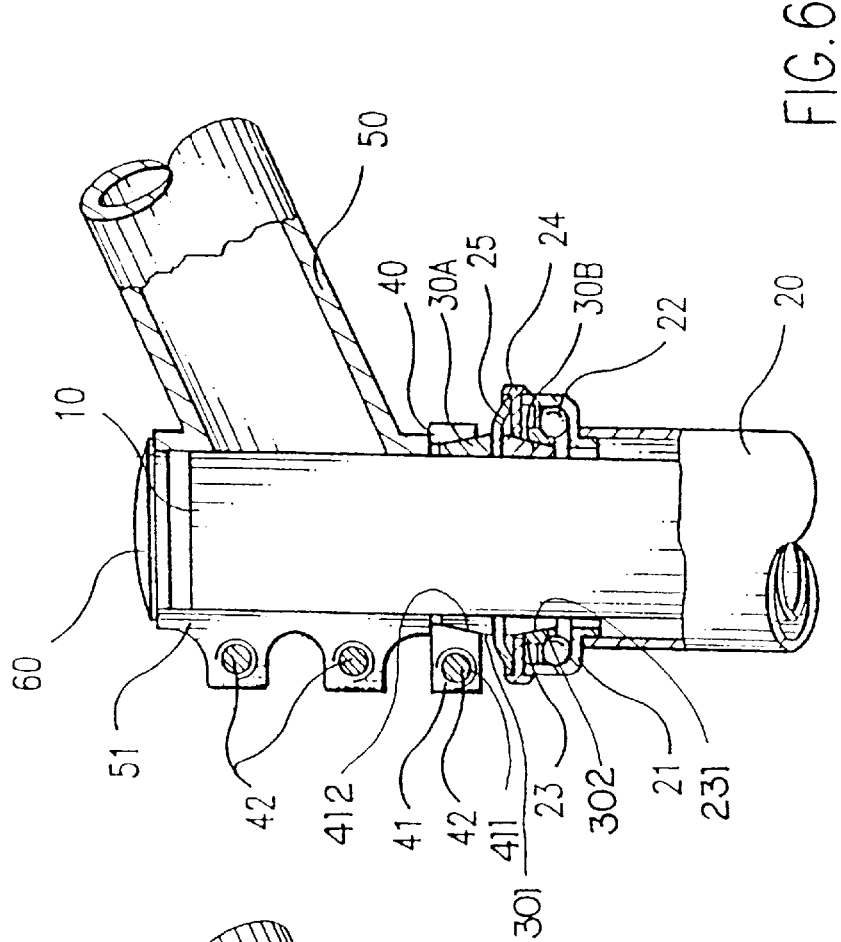
FIG. 6 shows a longitudinal sectional view of the present invention as shown in FIG. 5.
Figure 4:
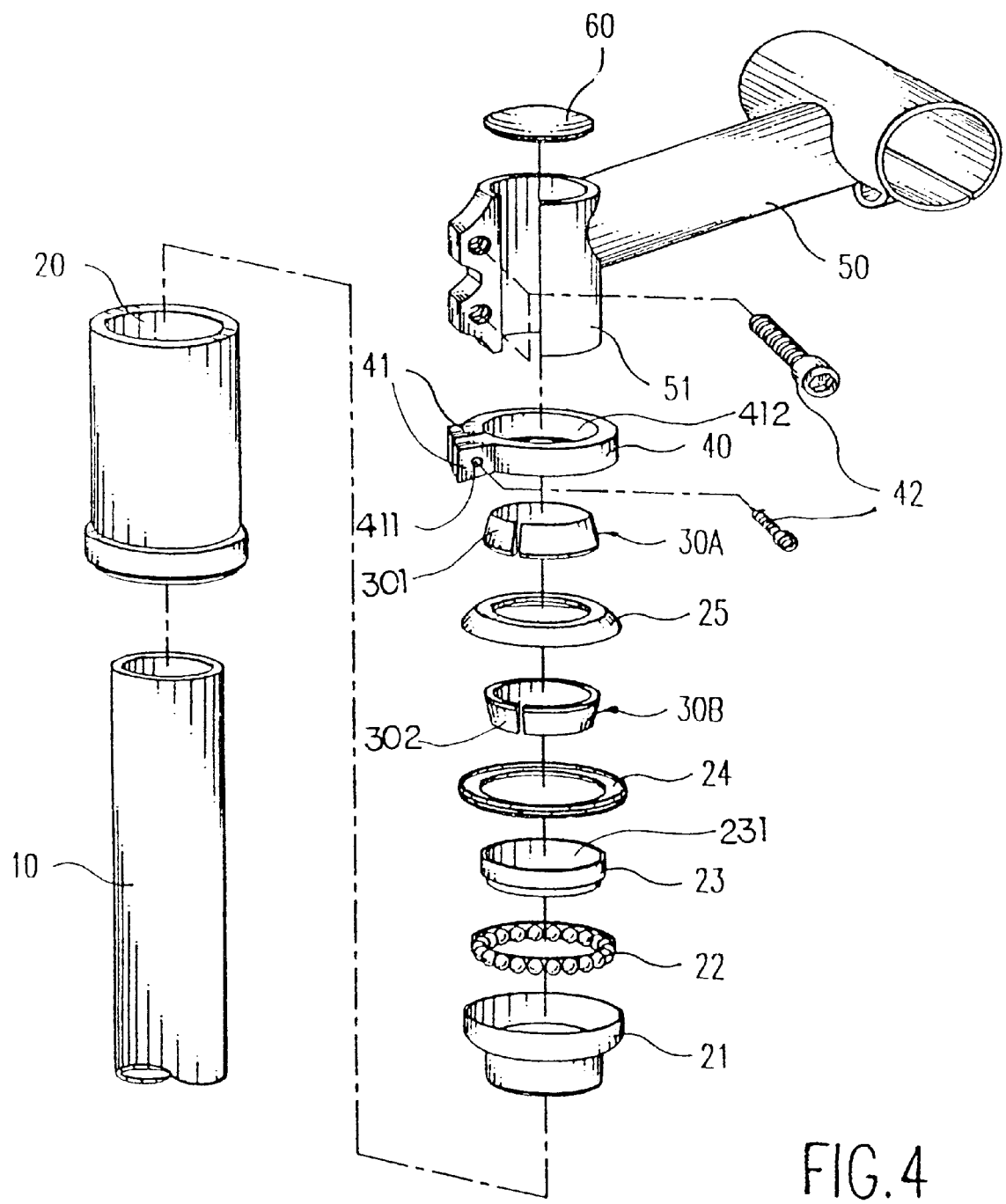
FIG. 4 shows an exploded view of another preferred embodiment of the present invention.
Figure 5:
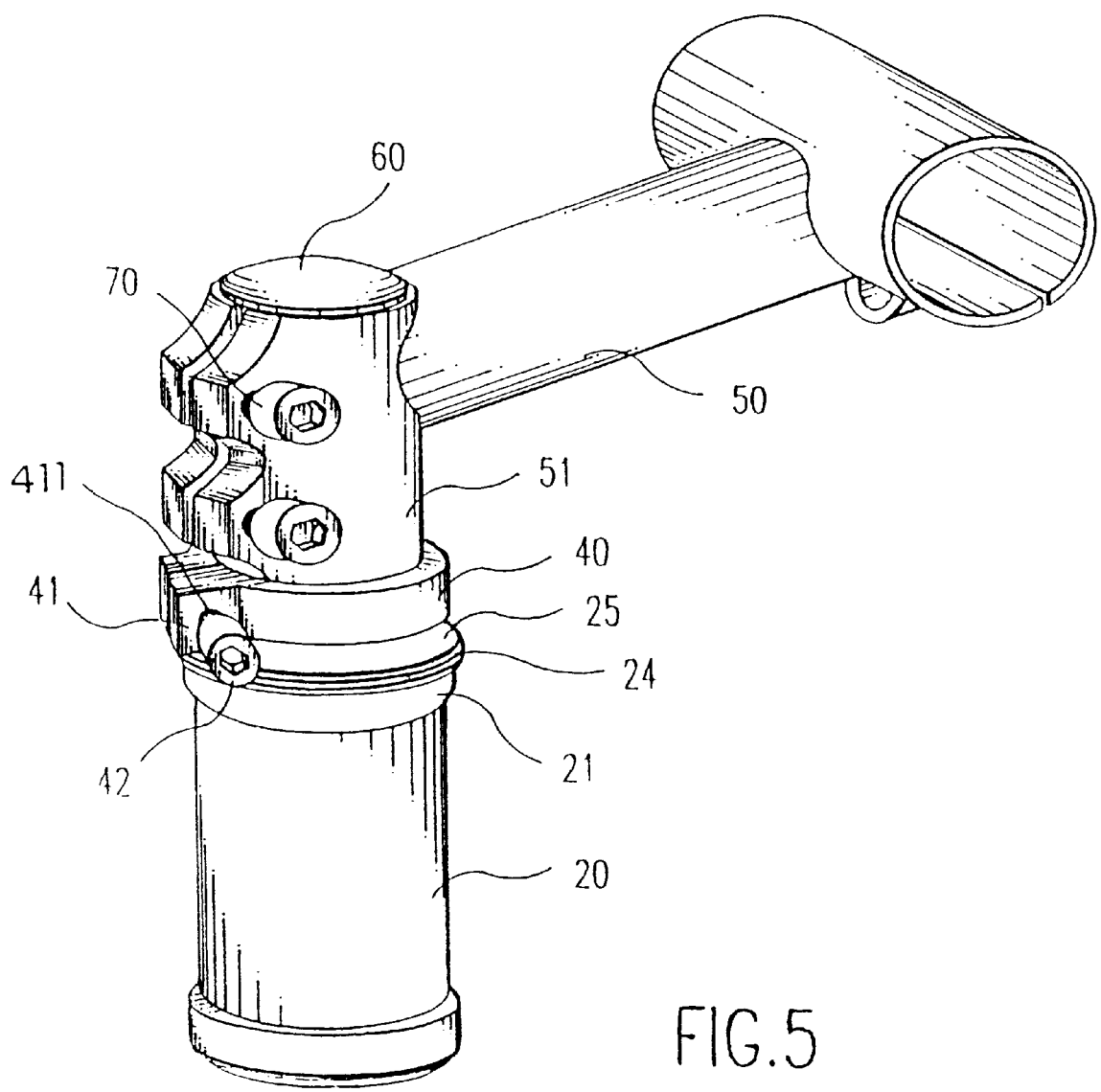
FIG. 5 shows a perspective view of another preferred embodiment in combination according to the present invention.

Another preferred embodiment of the present invention is shown in FIGS. 4 to 6, similar to the above first embodiment, a bicycle front fork tube 10 is fitted into a head tube 20 having an upper end to which a head bowl 21, a steering bearing 22, an inner ring 23, a locating ring 24, a lower pressing ring 30B, a locating pressing ring 25, an upper pressing ring 30A, and a clamping ring 40 fastened sequentially.

The clamping ring 40 also has an inner circumferential tapered surface 412 and is provided with a pair of lugs 41. Each lug 41 has a threaded hole 411 for engaging with a fastening bolt 42. The upper pressing ring 30A has an outer circumferential tapered surface 301 which is inclined inwardly and upwardly from its bottom end to its top end. The lower pressing ring 30B has an outer circumferential tapered surface 302 which is inclined inwardly and downwardly from its top end to its bottom end.

The upper pressing ring 30A and the lower pressing ring 30B are disposed independently between the clamping ring 40 and the inner ring 23 of the steering bearing 22 which has an inner circumferential tapered surface 231. The upper pressing ring 30A and the lower pressing ring 30B are intended to facilitate the set-up of the locating ring 24 which is disposed at the top of the head bowl 21, and the locating press ring 25 which is disposed between the upper pressing ring 30A and the lower pressing ring 30B. The locating ring 24 serves to locate the inner ring 23 of the steering bearing 22. The locating press ring 25 is located over the locating ring 24. When the locating press ring 25 is pressed by the upper pressing ring 30A, the lower pressing ring 30B is pressed by the locating press ring 25. The upper pressing ring 30A is fitted into the clamping ring 40 while the lower pressing ring 30B is fitted into the clamping ring 40 while the lower pressing ring 30B is fitted into the inner ring 23 of the steering bearing 22. Therefore, the upper outer circumferential tapered surface 301 of the upper pressing ring 30A is engaged with the inner circumferential tapered surface 412 of the clamping ring 40 and the lower circumgerential tapered surface 302 of the lower pressing ring 30B is engaged with the inner circumferential tapered surface 231 of the inner ring 23 of the steering bearing 22.

As the fastening bolt 42 of the clamping ring 40 is turned to fasten, the upper pressing ring 30A, the locating press ring 25 and the locating ring 24 are actuated to move downwards at the same time. The downward displacement of the locating press ring 25 causes the lower pressing ring 30B to exert a downward pressure on the inner ring 23 of the steering bearing 22. As a result, the steering bearing is fastened appropriately.

It is therefore readily apparent that the present invention has inherent advantages over the prior art. The steering bearing 22 of the head bowl 21 of the bicycle front fork tube 10 can be fastened appropriately and easily in a minute manner by rotating the fastening bolt 42 of the clamping ring 40. As a result, an excessive fastening of the bearing 22 is thus averted. In addition, the present invention is simple in construction and can be therefore made economically.

What is claimed is:

1. A device for making micro adjusting a steering bearing of a head bowl of a bicycle head tube, comprising an inner ring of said steering bearing, a pressing ring and a clamping ring, which are mounted sequentially together in an upper end of said bicycle head tube such that an upper end of said clamping ring is fastened with a handlebar upright tube of said bicycle, wherein said clamping ring provides a pair of lugs, each lug having a threaded hole for engaging with a fastening means, said clamping ring is provided with an inner circumferential tapered surface, said inner ring of said steering bearing is provided with an inner circumferential tapered surface, and said pressing ring is provided with an upper outer circumferential tapered surface and a lower outer circumferential tapered surface such that said upper outer circumferential tapered surface of said pressing ring is engaged with said inner circumferential surface of said clamping ring and said lower circumferential tapered surface of said pressing ring is engaged with said inner circumferential tapered surface of said inner ring.

2. A device for making micro adjusting a steering bearing of a head bowl of a bicycle head tube, comprising an inner ring of said steering bearing, a locating ring, a lower pressing ring, a locating press ring, an upper pressing ring, and a clamping ring, which are mounted sequentially together in an upper end of said bicycle head tube such that an upper end of said clamping ring is fastened with a handlebar upright tube of said bicycle, wherein said clamping ring provides a pair of lugs, each lug having a threaded hole for engaging with a fastening means, said clamping ring is provided with an inner circumferential tapered surface, said inner ring of said steering bearing is provided with an inner circumferential tapered surface, said upper pressing ring is provided with an outer circumferential tapered surface which is inclined inwardly and upwardly from a bottom end thereof to a top end thereof, and said lower pressing ring is provided with an outer circumferential tapered surface which is inclined inwardly and downwardly form a top end thereof to a bottom end thereof, such that said upper pressing ring and said lower pressing ring are disposed independently between said clamping ring and said inner ring of said steering bearing, said upper outer circumferential tapered surface of said upper pressing ring is engaged with said inner circumferential surface of said clamping ring and said lower circumferential tapered surface of said lower pressing ring is engaged with said inner circumferential tapered surface of said inner ring, and that said upper pressing ring and said lower pressing ring are intended to facilitate the set-up of said locating ring which is disposed at the top of said head bowl and serves to locate said inner ring of said steering bearing, and said locating press ring which is disposed between said upper pressing ring and said lower pressing ring and located over said locating ring.

\* \* \* \* \*